E. T. BURROWES.
WIND SHIELD FOR MOTOR VEHICLES.
APPLICATION FILED MAY 26, 1908.
985,883.
Patented Mar. 7, 1911.
5 SHEETS—SHEET 1.
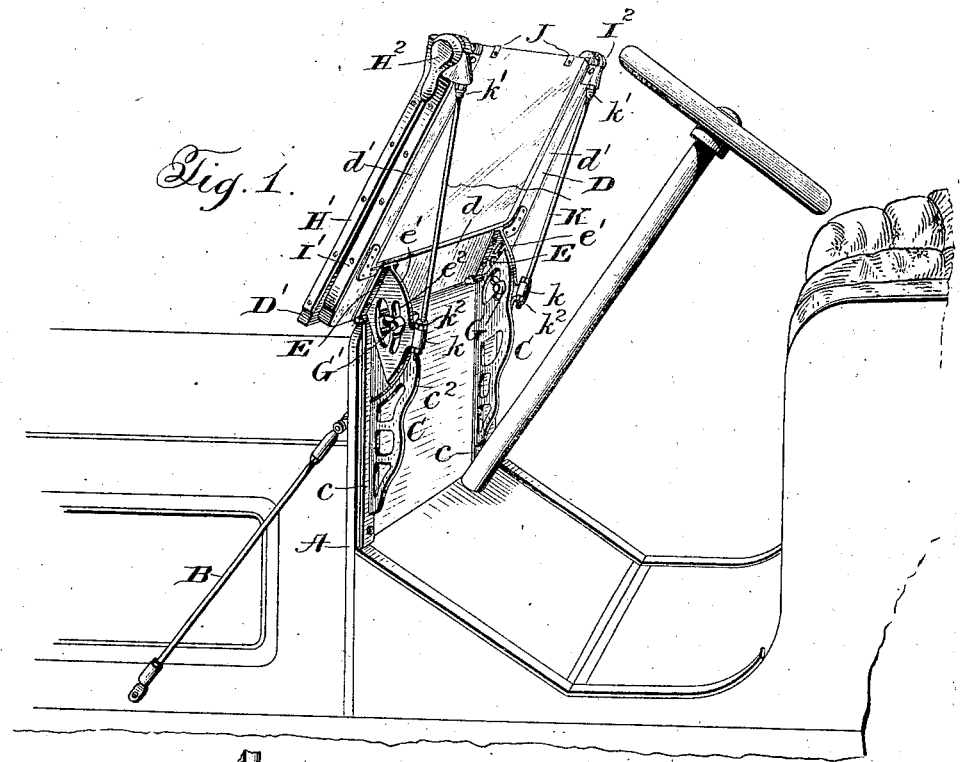
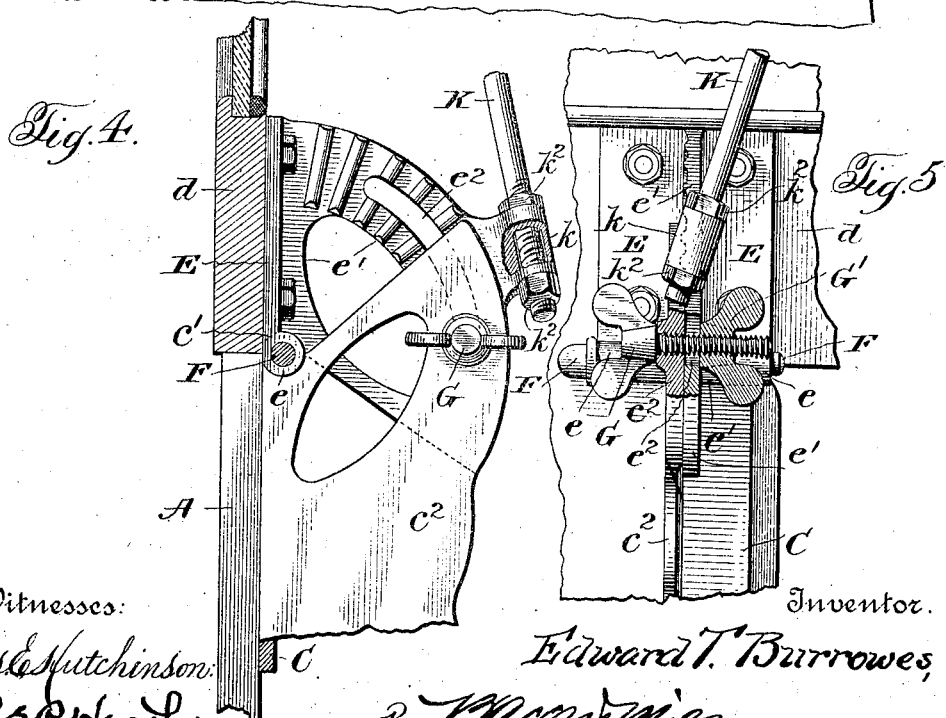
Witnesses:
Jas. E. Hutchinson
Thos. R. Strath
Inventor.
Edward T. Burrowes,
By Thos. M. Means
Attorneys.

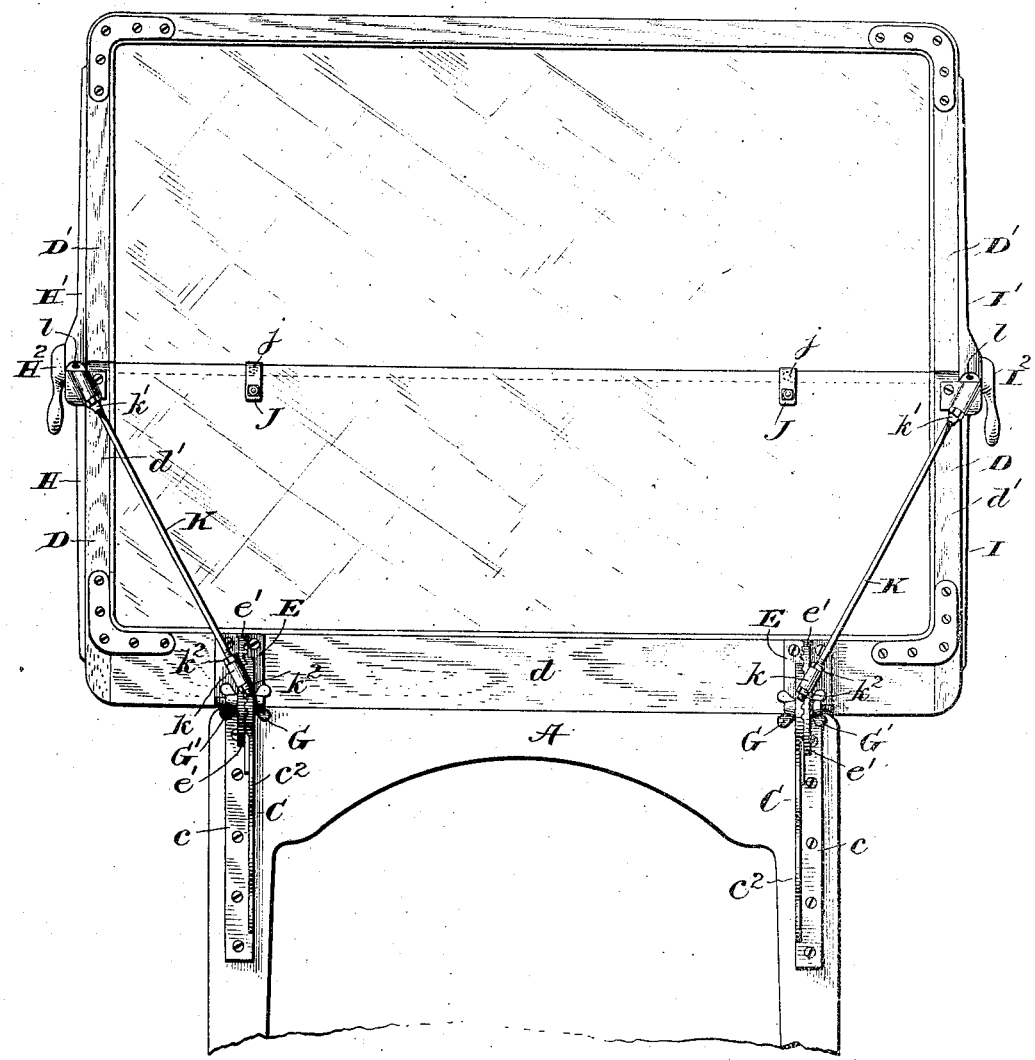

E. T. BURROWES.
WIND SHIELD FOR MOTOR VEHICLES.
APPLICATION FILED MAY 26, 1908.
985,883.
Patented Mar. 7, 1911.
5 SHEETS—SHEET 3.
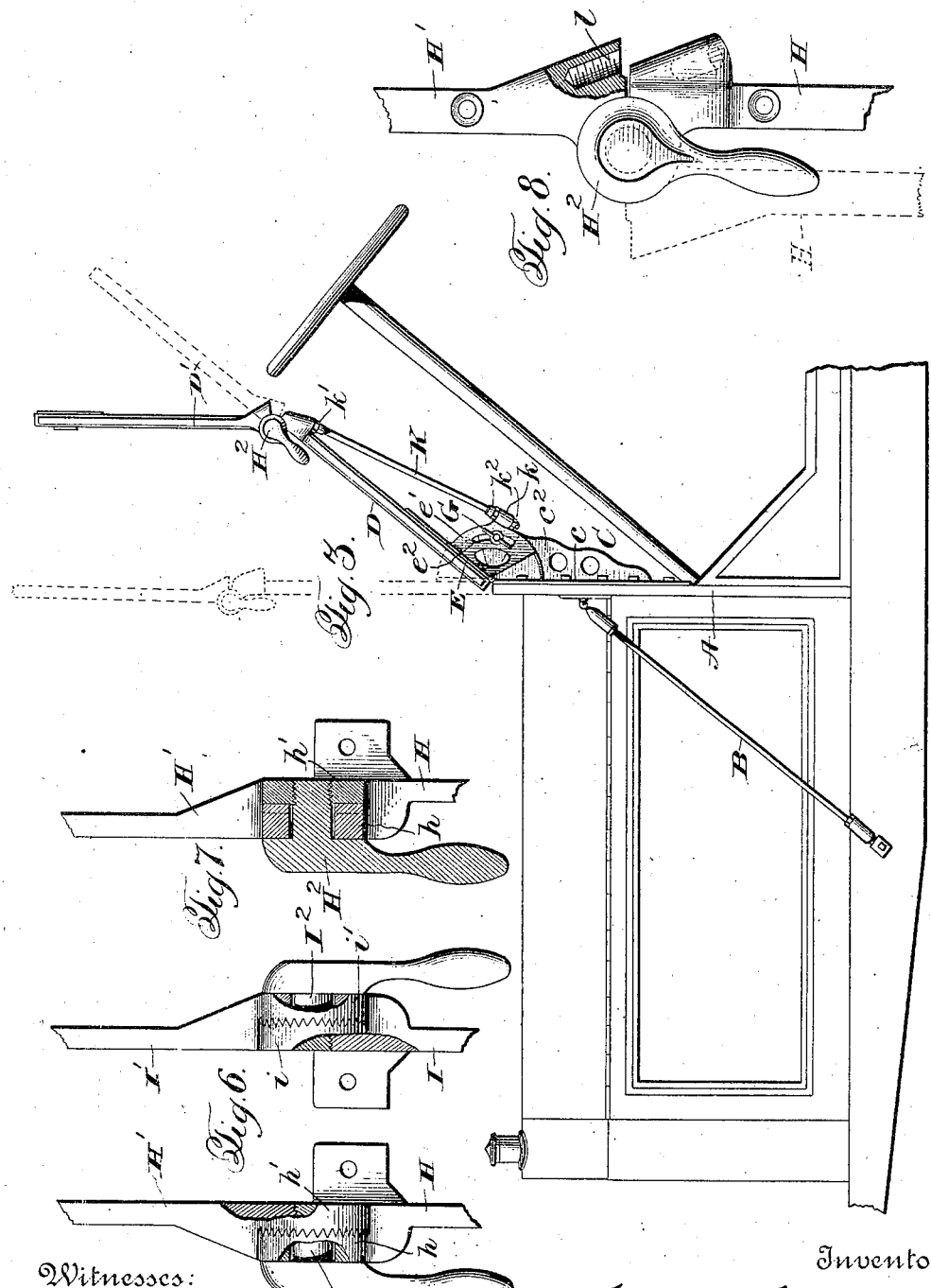
Witnesses:
Jas. E. Hutchinson
Thos. R. Heath
Inventor:
Edward T. Burrowes,
By T. W. McMillan Attorneys.

E. T. BURROWES.
WIND SHIELD FOR MOTOR VEHICLES.
APPLICATION FILED MAY 26, 1908.
985,883.
Patented Mar. 7, 1911.
5 SHEETS—SHEET 4.
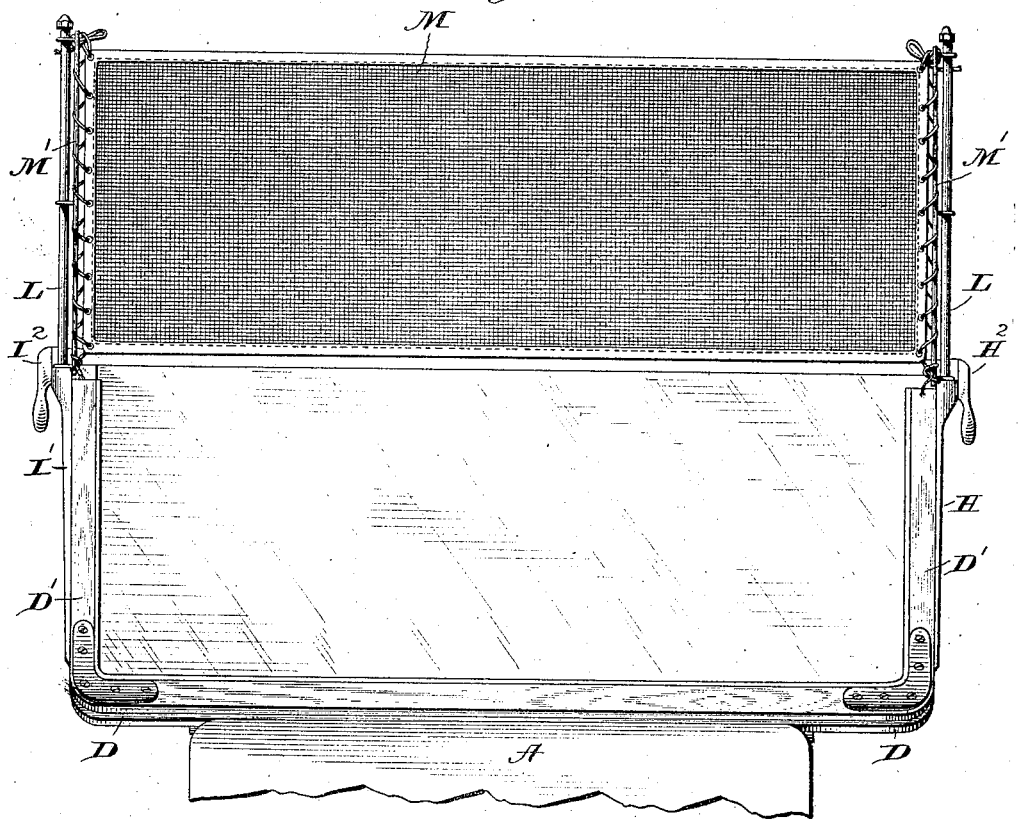
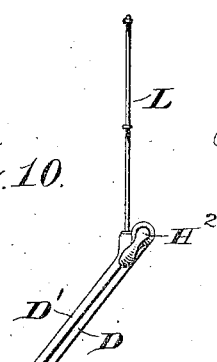
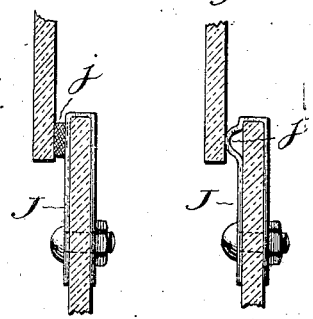
Witnesses:
Jas. E. Hutchinson
Thos. R. Heath
Inventor:
Edward T. Burrowes,
By _____ Attorneys

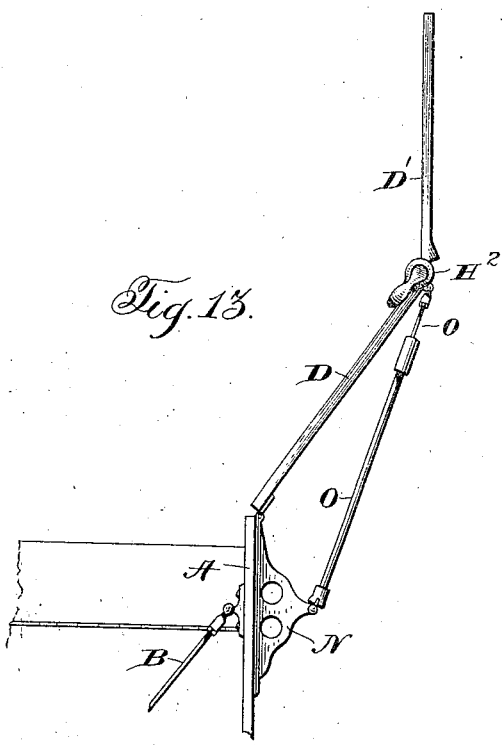
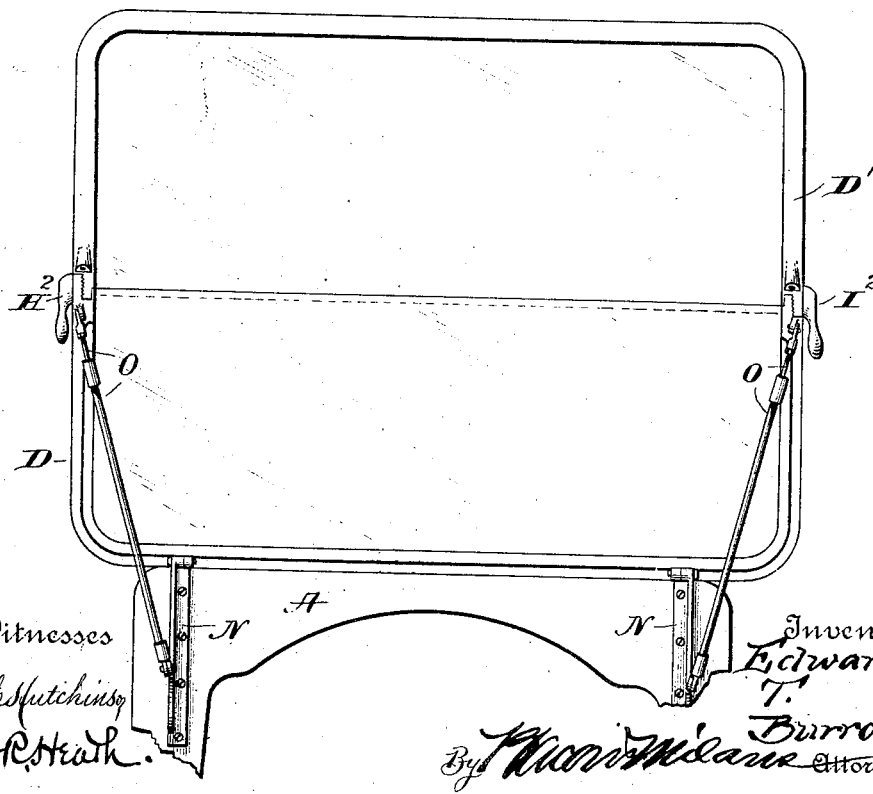

UNITED STATES PATENT OFFICE.

EDWARD T. BURROWES, OF PORTLAND, MAINE.

WIND-SHIELD FOR MOTOR-VEHICLES.

985,883.

Specification of Letters Patent. Patented Mar. 7, 1911.

Application filed May 26, 1908. Serial No. 435,021.

*To all whom it may concern:*

Be it known that I, EDWARD T. BURROWES, a citizen of the United States, residing at Portland, in the county of Cumberland and State of Maine, have invented certain new and useful Improvements in Wind-Shields for Motor-Vehicles, of which the following is a specification, reference being had therein to the accompanying drawing.
This invention relates to an improvement in wind shields for motor or like vehicles and more particularly to the class of wind shields which are made in sections to permit the same to be folded when not in use.
The object of the present invention is the provision of a wind shield of this character which is capable of a very wide range of adjustment to suit varying conditions.

A further object of the invention is the provision of a shield of this character which will not be subject to vibrations and will, at all times be maintained rigid, regardless of the position to which it may be adjusted or the vibrations to which the vehicle may be subjected.

A further object of the invention is the provision of a shield of this character which may be adjusted so as to afford the least resistance to the movement of the vehicle and which will at all times afford ample protection to the driver.

A further object of the invention is the provision of a wind shield, the sections of which are so fashioned as to offer no obstruction to the sight of the driver regardless of any adjustment thereof.

A further object of the present invention is the provision of an insect screen for use in connection with motor cars which may be readily secured to a position in front of the driver when it is desired to use the same.

A still further object of the invention is the provision of an adjustable wind shield for motor vehicles with means for rigidly securing and supporting the shield on the dash in a manner to avoid the necessity of the now commonly used extended metal supporting rods which extend from the front of the machine to the upper part of the lower section of the shield. These supporting rods are subjected to very severe vibrations which often loosen and serve to destroy the action of the shield proper. With my invention I do away with the long bars and substitute therefor short brace rods connected directly with the permanent dash of the vehicle and the frame body.

Other objects of the invention will be apparent from the detailed description hereinafter when read in connection with the accompanying drawings forming a part hereof, wherein a preferable embodiment of the invention is shown and wherein like numerals of reference refer to similar parts in the several views.

While a preferred embodiment of the invention is illustrated in the accompanying drawings, it will be understood that various changes and alterations can be made in the arrangement, positioning and construction of the several parts without departing from the nature and spirit of the invention.

In the drawings, Figure 1 is a perspective view of a motor vehicle equipped with a wind shield, the upper section of the shield being shown in its folded position, Fig. 2 is a rear elevation, the sections of the shield in this instance being adjusted so as to extend up vertically from the dash, Fig. 3 is a side elevation showing one position to which the wind shield may be adjusted, other positions being shown in dotted lines, Figs. 4 and 5 are detail views of the brackets employed for connecting the lower section of the shield to the dash board, Figs. 6, 7 and 8 are detail views of the means employed for adjustably connecting the upper and lower sections of the shield, Fig. 9 is a front elevation of the wind screen with the upper section thereof lowered and the insect screen in position, Fig. 10 is a side elevation of the same, Figs. 11 and 12 are detail views showing different forms of buffers which may be used between the two sections of the screen. Fig. 13 is a side elevation showing a modified form of the invention, and Fig. 14 is a rear elevation of the same.

Referring now more particularly to the drawings, A designates the dash board of a motor vehicle, which is of any desired construction and is preferably stiffened or braced by means of braces B which extend forwardly from the opposite sides thereof, said braces being of any desired construction and having the outer ends thereof connected in any suitable manner to the forward portion of the frame of the vehicle. Bolted or otherwise rigidly secured to the rear surface of the dash board of the vehicle adjacent the edges thereof are two brackets C, each of which comprises a base $c$ which extends vertically of the dash board for substantially the full length thereof and is provided at its upper end with an ear $c'$ which is positioned adjacent the top of the dash board when the bracket is secured thereto, and a web $c^2$ which extends rearwardly from the base $c$, the upper portion of said web being made of considerable width and extending upwardly from the bases $c$ so as to project for a considerable distance above the top of the dash board when the bracket is secured thereto. The wind shield is composed of a lower section D and an upper section D' which is adjustably connected, in a manner to be hereinafter more particularly set forth, to the upper edge of the lower section and is adapted when not in use to be folded down onto the outer surface thereof. The lower section D of the wind shield comprises an open frame in which is secured a glass panel, said frame comprising a bottom piece $d$ and side pieces $d'$ extending upwardly from the ends thereof, the inner edges of said bottom and side pieces being rabbeted to receive the glass panel which may be secured in the frame thus formed in any desired manner.

The upper section D' is similar in construction to the lower section D consisting of an open frame comprising a top piece and side pieces extending downwardly from the side pieces thereof, in which frame is secured a glass panel. It will be noted that the top of the frame of the lower section D and the bottom of the frame of the upper section D' are open and as the glass panels which are secured in said frames are not provided with any reinforces along their upper and lower edges, there is nothing which can in any way interfere with or obstruct the sight of the driver. In the preferred form of my invention the frames of the upper and lower sections of the shield are preferably made of wood, the side rails being connected in any suitable manner to the top and bottom rails of the two sections and metal angleplates of any desired construction being provided at the corners of the frame to reinforce the same. It will be understood, however, that the frames may be made of a single piece of some light metal such as aluminum, in which case the interior of the frames will be provided with grooves to receive the edges of the glass panels and a packing of rubber or other elastic material will be used to hold the panes in position. Bolted or otherwise rigidly secured to the rear face of the bottom rail $d$ of the lower section D of the wind shield are two brackets E, each of which comprises a base plate which is provided at its lower edge with a pair of separated apertured ears $e$ which are designed to project a slight distance below the lower edge of the rail $d$ when the bracket is secured thereto, and a web $e'$ which extends rearwardly from the central portion of the base of the bracket, said web being of considerable width and the lower portion thereof extending downwardly for a considerable distance below the lower edge of the base of the bracket. When the bottom rail $d$ of the lower section D of the wind shield is supported in the proper position upon the upper edge of the dash board of the vehicle, the apertured ears $c'$ at the upper ends of the brackets C secured to the dash board will lie between the separated ears $e$ of the brackets E secured to the lower section D of the wind shield with the openings therein in alinement, and with the parts in this position the lower section of the wind shield is coupled to the dash board by pintles F which pass through the alined apertures in the ears of the respective brackets E and C. With the parts in this position the webs $e'$ of the brackets E are designed to overlie the webs $c^2$ of the brackets C, and owing to the particular construction of the said webs heretofore described, it will be seen that regardless of the position of adjustment to which the lower section D of the wind shield is moved, said webs are always overlapped to considerable extent, so that when they are clamped together, in the manner to be hereinafter set forth, a very rigid construction will be obtained. From the construction heretofore described, it will be seen that the lower section of the wind shield may be swung rearwardly at any desired angle to the dash board and to hold said section at the desired inclination, thumb screws G are provided which are threaded in the webs $c^2$ of the brackets C and the stems of which project through segmental slots $c^3$ formed in the webs $e'$ of the brackets E and have threaded thereon clamping nuts G'. The adjacent surfaces of the webs $c^2$ of the brackets C and $e'$ of the brackets E are preferably provided with complementary projections and recesses which are adapted to coöperate when the webs are clamped together to prevent any slipping of the parts.

Secured to the outer edges of the side rails $d'$ of the lower section D of the wind shield are metallic strips H' and I which extend substantially the full length of said side rails and are provided at the upper ends thereof with ears $h$ and $i$ which project for a slight distance above and beyond the top of said side rails. The ears $h$ at the top of the metallic strip H is offset laterally so as to be positioned some distance beyond the outer edge of the side rail $d'$ to which it is secured, and said ear is provided with an unthreaded opening extending centrally therethrough and with a plurality of radially disposed serrations on the inner face thereof, while the ear $i$ at the upper end of the metallic strip I is adapted to lie flush with the side rail $d$ to which said strip is secured and is provided with a threaded opening extending centrally therethrough and with a plurality of radially disposed serrations on the outer surface thereof. Secured to the side rails of the upper section $D'$ of the wind shield are two metallic strips $H'$ and $I'$, which are substantially similar in construction to the strips H and I heretofore described, said strips being provided at their lower ends with ears $h'$ and $i'$ which project for a slight distance downwardly and outwardly beyond the lower edge of the upper section. The ear $h'$ is secured flat against the side rail of the upper section and is adapted when the sections of the shield are assembled to lie on the inner side of the ear $h$ of the strip H and is provided with a threaded opening extending therethrough in alinement with the smooth opening in the ear $h$ and with a plurality of radially disposed serrations on the outer face thereof, which are adapted to coöperate with the serrations on the inner surface of the ear $h$. The ear $i'$ at the lower end of the metallic strip $I'$ is offset laterally from said strip so as to lie on the outside of the ear $i$ at the upper end of the strip I and is provided with a smooth opening extending therethrough and positioned centrally thereof in alinement with the threaded opening in the ear $i$ and with a plurality of radially disposed serrations on the inner face thereof which are adapted to coöperate with the serrations on the outer face of the ear $i$. The upper and lower sections of the wind shield are locked together by means of locking bolts $H^2$ and $I^2$, the stems of said bolts being smooth at the inner ends thereof and having their outer ends threaded. The locking bolt $H^2$ passes through the smooth aperture in the ear $h$ end of the strip I which is secured to the lower section D of the wind shield and engages the threaded aperture in the ear $h'$ at the lower end of the strip $H'$ secured to the upper section $D'$ of the wind shield, while the locking bolt $I^2$ passes through the smooth aperture in the ear $i'$ at the lower end of the strip $I'$ secured to the upper section of the wind shield and engages the threaded aperture in the ear $i'$ at the upper end of the strip I which is secured to the lower section of the wind shield. From this construction it will be seen that when the locking bolts $H^2$ and $I^2$ are loosened, the upper section $D'$ of the wind shield may be shifted laterally a sufficient extent to disengage the serrations on the ears $h'$ and $i'$ carried thereby from the complementary serrations on the ears $h$ and $i$ carried by the lower section of the wind shield. The upper section of the wind shield can then be adjusted outwardly at any desired angle with reference to the lower section and when the desired adjustment has been obtained the upper section is again shifted laterally to cause the serrations on the ears thereof to engage with the serrations on the ears carried by the lower section, and the locking bolts $H^2$ and $I^2$ actuate to lock the upper and lower sections tightly together. The upper section $D'$ when not in use is designed to be folded flat against the outer surface of the lower section D and locked in this position by means of the locking bolts $H^2$ and $I^2$. The rearward movement of the upper section on the lower section is, however, limited by complementary shoulders formed on the metallic strips H and $H'$ and I and $I'$, said upper section when in its extreme rearward position being substantially in alinement with the lower section and thereby forming therewith practically a single flat shield.

The lower edge of the pane of glass in the upper section $D'$ of the shield overlaps for a slight distance the upper edge of the glass in the lower section D and as the edges are not provided with any binding or reinforcement of any character there is a possibility of their becoming chipped by reason of the vibration to which devices of this character are subjected. To avoid this, the glass in one of said sections is provided with a buffer or buffers adjacent the edge thereof which acts as a spacer between the panes in the upper and lower sections and prevents the same from coming in direct contact with each other regardless of the vibrations to which the device may be subjected. In the preferred form of the invention this buffer comprises a strip J of celluloid, metal or other sheet material which is folded over the upper edge of the pane of glass in the lower section D of the shield and is secured thereto by means of a bolt which passes through the ends of said strip and the portion of glass positioned therebetween. Carried by the portion of the strip J which lies upon the outer face of the glass is a buffer $j$ with which the inner surface of the glass in the upper section of the shield is adapted to contact. The buffer $j$ may either be a small pad of rubber or other flexible material or when the strip is formed of celluloid a portion of the strip itself may be struck up to form the buffer. To hold the lower section D of the wind shield perfectly stiff at all times, the same is preferably provided with braces at the sides thereof, which extend from a point adjacent the upper edge of the section to the brackets E which project from the lower portion of the section. These braces preferably comprise rods K, the upper ends of which are threaded into bosses formed integral with the upper ends of the metallic strips H and I secured to the side rails of the lower section D, and the lower ends of which are threaded and pass loosely through sleeves $k$ positioned on the outer edges of the webs $e'$ of the brackets E and formed integral therewith. The upper ends of the braces K are held against movement by means of locking nuts $k'$ threaded thereon and the lower ends thereof are adjustably secured by means of locking nuts $k^2$ on the threaded portions thereof on opposite sides of the sleeves $k$. The fact that the lower ends of the braces K are adjustably secured is important as it enables the shield to be used with vehicles having dash boards of any type. The width of the dash board varies considerably on different makes of machines and consequently the position of the brackets E on the lower section of the wind shield must frequently be changed to suit the particular machine upon which the wind shield is to be used and the adjustability of the braces K permits this to be done.

The lower ends of the metallic strips H' and I' are provided with integral bosses in the bottom of which are upwardly extending threaded recesses $l$. When the upper section D' is in its folded position the threaded recesses $l$ will extend downwardly and are, in this position adapted to receive the threaded ends of a pair of rods L between which is supported an insect screen. The insect screen is preferably formed of a netting M of linen, silk, or other flexible material the edges of which are laced to rods M' which are provided with rings which engage the rods L heretofore referred to. When not in use the rods L may be removed and the entire screen rolled up and placed in a tubular or other box.

In Figs. 13 and 14 of the drawings is illustrated a modified form of the invention. In this form of the invention the shield is formed of upper and lower sections adjustably connected in the same manner as the form heretofore described, the only difference in construction, being that the frames of the upper and lower sections are formed of metal and the ears which project therefrom are formed integral therewith. In this form of the invention a pair of rearwardly extending brackets N are secured to the rear side of the dash board and the lower section of the wind shield is hinged in any suitable manner to the upper ends of said brackets. A pair of telescopic braces O are provided, the opposite ends of which are pivotally connected respectively to the brackets N and the upper portion of the lower section of the wind shield. Any suitable means may be provided for locking the sections of the telescopic braces together to hold the lower section of the wind shield in any desired position of angular adjustment.

From the construction described herein, it will be apparent that the shield is capable of a very wide range of adjustment and in fact may be adjusted to suit almost any condition. The rearwardly adjustable lower section of the shield enables the same to be brought in as close as desired to the driver, while at the same time if it is desired to do so, the shield may be adjusted so as to form substantially a single pane extending vertically up from the dash board. The upper section may be adjusted at any desired angle with reference to the lower section or it may be brought into alinement with the lower section and both sections then adjusted rearwardly so as to form a substantially flat rearwardly inclined shield extending from the dash board to a position above the driver. The shield in this position offers no obstruction to the sight of the driver and at the same time offers much less resistance to the movement of the vehicle than when the shield extends up vertically from the dash board.

Having thus described the invention what is claimed and desired to be secured by Letters Patent is:

1. In combination with a dash board, a pair of brackets secured to the inner side thereof and extending substantially the full height thereof, said brackets being provided with outwardly projecting webs extending substantially the entire length thereof, a wind shield hinged at the edge of the dash board said shield comprising an open frame having a panel therein, a pair of brackets secured to the bottom of the frame inwardly of the sides thereof, and provided with outwardly projecting webs arranged to overlap the webs of the brackets on the dash, brace rods extending from the brackets on the frame across the corners thereof and having their upper ends secured to the sides of the frame, and means for clamping the overlapping webs of the brackets together in various positions of adjustment.

2. The combination with a dash board, of a wind shield, hinged brackets connecting said shield and dash board, said brackets being provided with overlapping webs, means for clamping the overlapping webs of the brackets together, and adjustable braces extending from the webs of the brackets to the sides of the wind shield.

3. The combination with a dash board, of a wind shield comprising adjustably connected upper and lower sections hinged brackets connecting the lower section of said shield and the dash board, said brackets being provided with overlapping webs, means for clamping the overlapping webs of the brackets together, and adjustable braces extending from the webs of the brackets on the lower section of the shield to the sides of the wind shield.

4. The combination with a dash board, of a pair of brackets secured thereto, a wind shield extending upwardly from said dash board, brackets carried by said wind shield and pivotally connected to the brackets on said dash board, means for holding the brackets in different positions of relative adjustment and adjustable braces extending from the brackets on the wind shield to the sides thereof.

5. The combination with a dash board, of a wind shield, a pair of brackets secured to the inner surface of the dash board and extending substantially the entire height thereof, said brackets being provided with outwardly projecting webs extending the full length thereof said web tapering downwardly, brackets carried by the shield and hinged to the brackets of the dash board, said brackets being provided with outwardly extended webs adapted to overlie the webs of the brackets on the dash board, the overlying faces of the brackets being provided with coöperating lugs and recesses, and a brace extending from the shield bracket to the top of the shield and means for clamping the webs of the brackets together.

6. The combination with a dash board, of a wind shield attached at its lower edge thereto extending upwardly therefrom, said wind shield comprising upper and lower overlapping sections, the adjacent edges of the glass portion thereof being unprotected and a buffer between the overlapping glass portions of said sections comprising a pad member secured to the edge of the shield and located intermediate the ends thereof.

7. In a sectional wind shield for motor vehicles, the combination with a lower section of an upper section hinged to the lower section means at the hinged joint for securing the upper section in different positions of adjustment, the lower parts of the sides of the upper section having threaded sockets therein for the purpose specified.

8. The combination with a braced dash board, of brackets on the rear of the dash board and extending substantially the height thereof and having outstanding webs, a wind shield pivoted at the edge of the dash board and having secured to the side thereof brackets provided with outstanding webs adapted to overlie the webs of the brackets on the dash board, means for rigidly clamping the webs of the brackets in various positions of adjustment and rigid braces extending from the overlapping portions of the webs of the brackets to the sides of the wind shield.

9. A wind shield for vehicles comprising a lower section having a glass panel therein with an exposed upper edge, an upper section having a glass panel with an exposed lower edge and a buffer carried by one of said panels and interposed between the edges of the panels to prevent vibrations.

10. A wind shield comprising a lower section consisting of an open frame formed of a bottom and side rails, an upper section consisting of an open frame formed of a top and side rails hinged to said lower section, glass panels secured in said open frame, the free edges of said panels being adapted to overlap when the shield is in operative position, a clip secured over the free edge of one of said glass panels, and a buffer carried by said clip.

11. In a wind shield for motor vehicles, the combination with the vehicle dash, of a shield member of a length greater than the dash whereby its ends extend beyond the dash, brackets on the dash, brackets on the lower rail of the shield member located inwardly beyond the ends thereof, adjustable connections between the brackets, and diagonal braces extending from the brackets to the outer upper corners of the shield member.

12. In a wind shield for motor vehicles, the combination with a dash, of a shield member comprising a U-shaped frame open at its top, and a glass panel secured in said frame, brackets on the lower rail of the shield member located inwardly of the ends thereof, diagonal braces extending from said brackets to the upper portions of the sides of the U-shaped frame of the shield member, brackets on the dash, and adjustable connections between the brackets on the dash and the brackets on the shield member.

EDWARD T. BURROWES.

Witnesses:
L. GROVES WEYMOUTH,
FRANK L. PICKER.